(12) United States Patent
Wiedemeier et al.

(10) Patent No.: US 10,962,138 B2
(45) Date of Patent: Mar. 30, 2021

(54) LOW-PROFILE, LARGE-APERTURE, REMOTELY-TRIGGERED VALVE

(71) Applicant: United States of America as represented by the Secretary of the Navy, San Diego, CA (US)

(72) Inventors: Brandon J. Wiedemeier, San Diego, CA (US); Carl E. Lostrom, San Diego, CA (US); N. Todd Miller, San Diego, CA (US); Brooke A. Bachmann, San Diego, CA (US); Jeffrey M. Lloyd, San Diego, CA (US); Jesse T. Caldwell, Alpine, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 170 days.

(21) Appl. No.: 16/263,552

(22) Filed: Jan. 31, 2019

(65) Prior Publication Data
US 2020/0248834 A1    Aug. 6, 2020

(51) Int. Cl.
| | |
|---|---|
| *F16K 31/44* | (2006.01) |
| *F16K 31/528* | (2006.01) |
| *F16K 31/46* | (2006.01) |
| *F16K 31/56* | (2006.01) |
| *F16K 31/02* | (2006.01) |

(52) U.S. Cl.
CPC ........ *F16K 31/5286* (2013.01); *F16K 31/025* (2013.01); *F16K 31/46* (2013.01); *F16K 31/56* (2013.01)

(58) Field of Classification Search
CPC .... F16K 31/025; F16K 31/56; F16K 31/5286; F16K 31/46
USPC .......................................... 137/846
See application file for complete search history.

(56) References Cited

U.S. PATENT DOCUMENTS

| | | | |
|---|---|---|---|
| 2,106,176 A * | 1/1938 | Huffman | ................ F16K 31/56 137/68.23 |
| 4,278,102 A | 7/1981 | Kelley | |
| 9,562,408 B2 | 2/2017 | Wood | |
| 9,631,462 B2 | 4/2017 | Tirado | |
| 2011/0253025 A1 | 10/2011 | Bossert | |
| 2013/0266380 A1 | 10/2013 | Capron | |
| 2017/0174191 A1 | 6/2017 | Oberheu | |

* cited by examiner

*Primary Examiner* — P. Macade Nichols
(74) *Attorney, Agent, or Firm* — Naval Information Warfare Center, Pacific; Kyle Eppele

(57) ABSTRACT

A valve for delivery of fluid between two chambers. The valve includes a plug, force spring that opens the plug, and a base that joins/mates with the inner surface of a chamber. Plug sealing mechanisms seal the plug to the base. Chamber sealing mechanisms seal an inner surface of a chamber bore or conduit. The valve also includes a trigger arm that holds the plug down until the trigger arm is actuated to cause the plug to move and the valve to open. The valve also includes a remotely-actuatable trigger for releasing the trigger arm. A channel permits the transfer of fluid from one side of the plug to the other.

14 Claims, 4 Drawing Sheets

LOW-PROFILE, LARGE-APERTURE, REMOTELY-TRIGGERED VALVE

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 3600, San Diego, Calif., 92152; telephone (619)553-3001; email: ssc_pac_t2@navy.mil. Reference Navy Case No. 103682.

BACKGROUND

Field of Invention

This disclosure relates generally to valves and, more particularly, to remotely-triggered valves for quick delivery of fluid from one chamber to another. Remotely-operated valves tend to be large, heavy, and tend to be actuated by a specific voltage/amperage. Standard relief valves, poppet valves, actuated valves and burst discs have been used to deliver fluid from one side of a chamber to another. However, these prior art devices have short-comings (e.g., inability to automatically open and stay open without drawing power, inability to generally prevent premature triggering due to differential pressures, and inability to open in the presence of sufficient differential pressure. There is a need for an improved remotely-triggered valve.

SUMMARY

Disclosed herein is a valve comprising base, a plug, a spring, a lever arm, and a trigger. The base is configured to be mounted between first and second chambers. The base comprises an internal bore and a plurality of orifices in fluid communication with the internal bore. The plug is shaped so as to provide a fluid-tight seal that prevents a transfer of fluid between the first chamber and the second chamber when the plug is fully inserted into the internal bore. The spring is operatively coupled to the base and the plug so as to provide force to cause the plug to move out of the internal bore and thus to permit the transfer of fluid between the first chamber and the second chamber. The lever arm is pivotally mounted to the base and comprises a long end and a short end. The short end is configured to lodge in a groove disposed in the plug when the plug is fully inserted into the internal bore. The trigger is releasably mounted between the base and the long end of the lever arm and configured to hold the long end in a fixed position with respect to the base until triggered, at which time the trigger allows the long end to move with respect to the base.

Another embodiment of the valve may be described as comprising a plug, a spring, a base, one or more plug sealing mechanisms, chamber sealing mechanisms, at least one trigger arm, a trigger arm actuation device, and at least one channel. The plug in this embodiment is configured to prevent a transfer of fluid between a first chamber and a second chamber. The spring in this embodiment is configured to provide force to cause the plug to move in order to permit the transfer of fluid between the first chamber and the second chamber. The base in this embodiment is configured to removeably join or mate to an inner surface of one of said first chamber and said second chamber. The one or more plug sealing mechanisms in this embodiment are attached to said plug and are configured to seal the plug to the base. The chamber sealing mechanisms are configured to seal an inner surface of at least one of said first chamber and said second chamber. The at least one trigger arm nests in a groove in the plug and is configured to actuate the spring, thus causing the plug to move and permit the transfer of fluid between the first chamber and the second chamber. The at least one trigger arm is further configured to prevent plug movement until the at least one trigger arm is actuated. The trigger arm actuation device in this embodiment is configured to actuate the at least one trigger arm. The trigger arm actuation device in this embodiment is a burn plug coupled to an electrical connector that is attached to a wire that heats when current is applied, causing the burn plug to melt and separate from the wire. The least one channel in this embodiment is disposed between the first chamber and the second chamber and is configured to provide a path for the transfer of fluid between the first chamber and the second chamber. The valve is configured to be positioned between the first chamber and the second chamber.

BRIEF DESCRIPTION OF THE DRAWINGS

The accompanying drawings, which are incorporated in and form a part of the specification, illustrate example embodiments and, together with the description, serve to explain the principles of the invention. In the drawings.

DETAILED DESCRIPTION OF SOME EMBODIMENTS

Figure 1A:
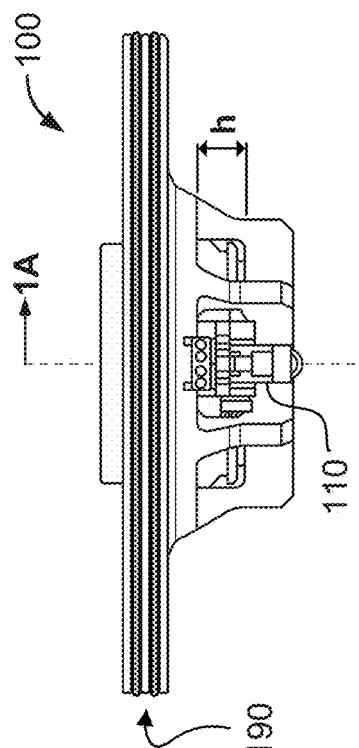
FIGS. 1A-1F illustrate a low-profile, large-aperture, remotely-triggered valve in accordance with aspects of the present disclosure.
Figure 1B:
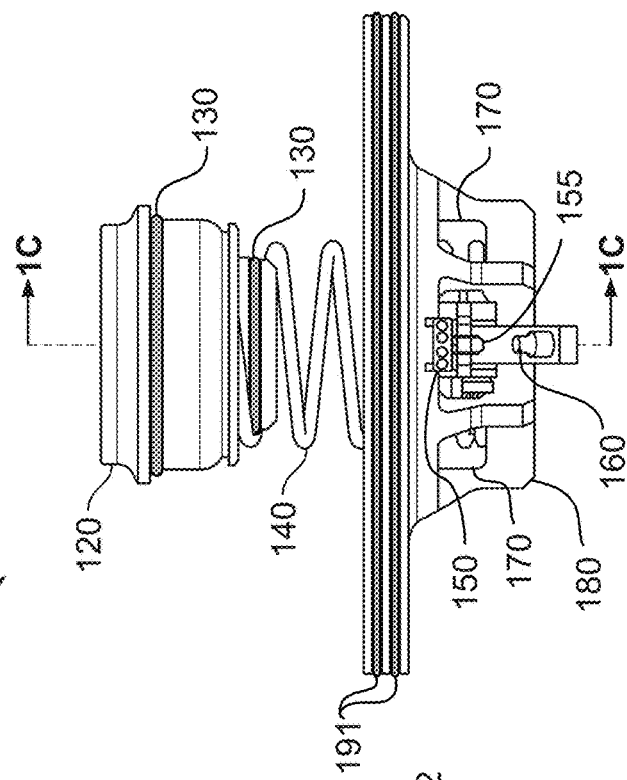
Figure 1C:
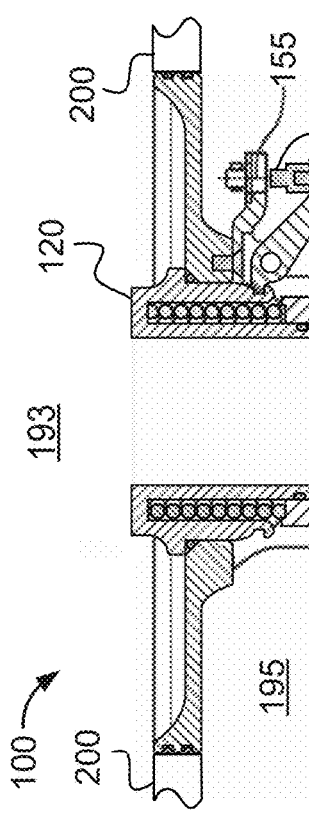
Figure 1D:
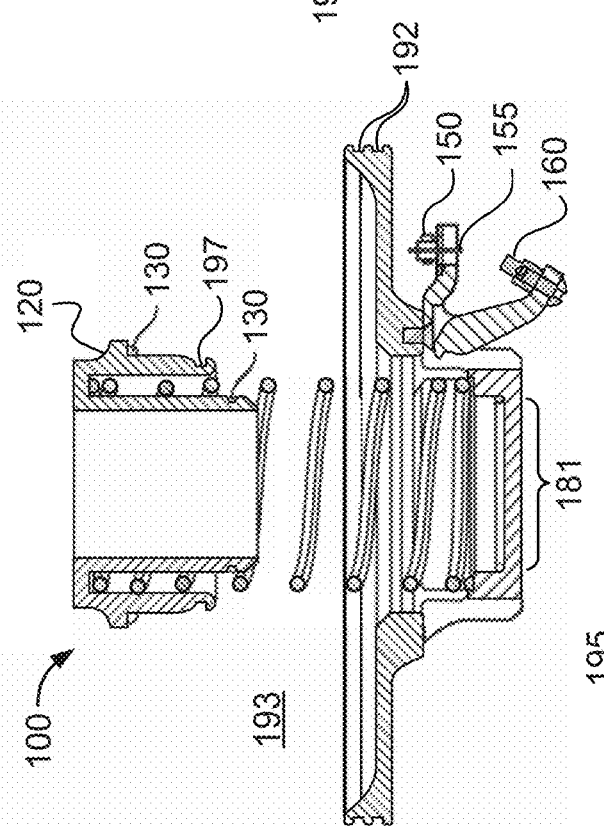
Figure 1E:
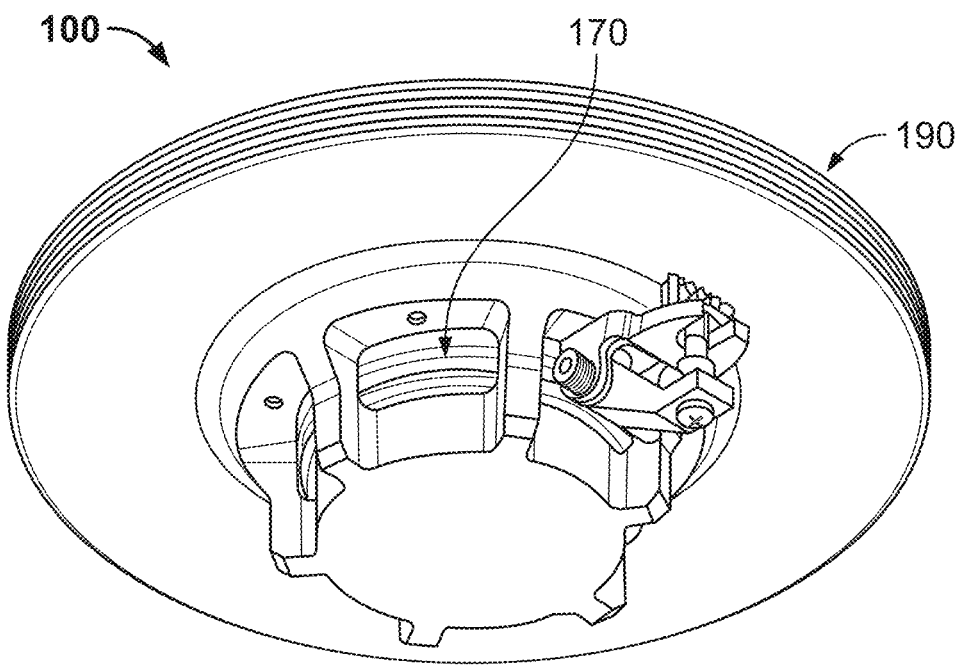
Figure 1F:
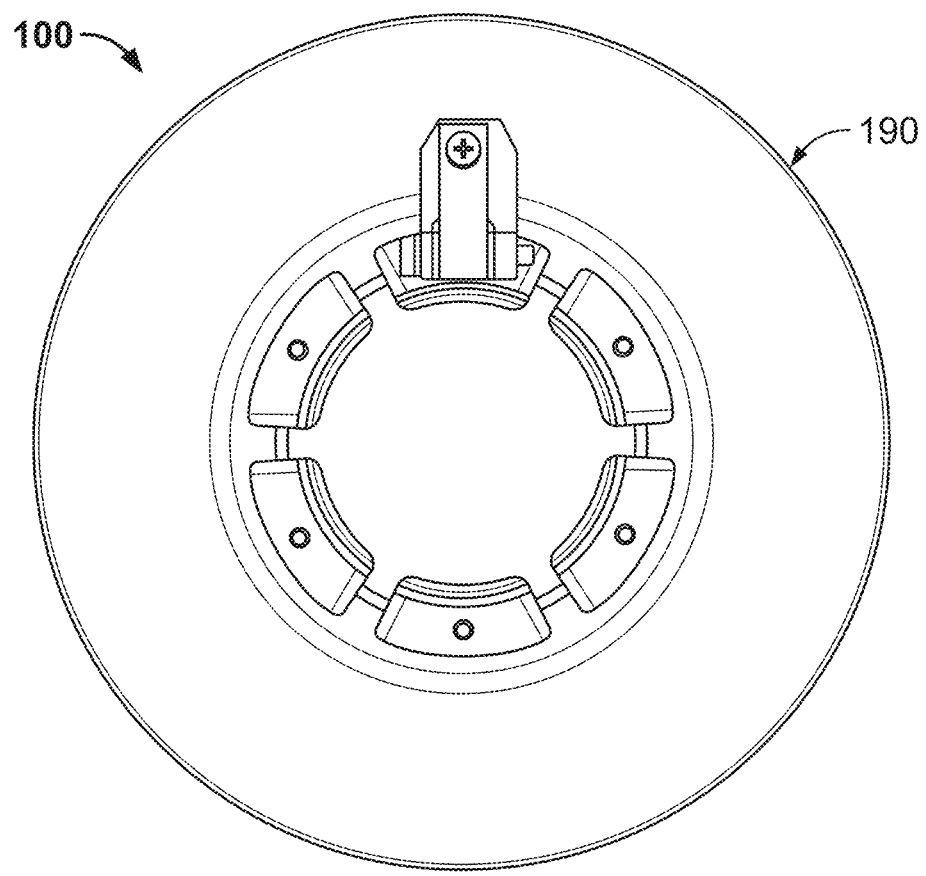

Described herein is a low-profile, large-aperture valve that can be remotely triggered or actuated to open. The valve tolerates differential pressures without premature triggering, and has a large flow rate once opened. The valve can be triggered to open with a large voltage range and comparable amperage to commercially available valves.

The valve may automatically open and stay open without drawing power. The present valve opens with the presence of sufficient differential pressure, survives a caustic environment, and operates even after being exposed to water for an extended period of time. The valve is also shock resistant, temperature tolerant, and has the capability of electronic control.

FIGS. 1A-1F illustrate a low-profile, large-aperture, remotely-triggered valve 100 in accordance with aspects of the present disclosure. As shown, the valve 100 includes a trigger 110, a plug 120, plug sealing mechanisms 130, a plug opening device 140, an electrical connector 150, a wire 155, a burn plug 160, a series of orifices 170, a base 180, and a chamber interface seal 190. The valve 100 is intended to be mounted between a first chamber 193 and a second chamber 195. The valve 100 has an open position shown in FIGS. 1C and 1D and a closed position shown in FIGS. 1A and 1B. The chamber interface seal 190 may be any means of mounting the valve 100 between the first and second chambers 193 and 195 in a fluid-tight manner. Suitable examples of the chamber interface seal 190 include, but are not limited to, O-rings, welding, adhesives, compression seals, threaded attachments, and a press fit. In the present illustration, the chamber interface seal comprises a set of two O-rings 191 disposed in grooves 192 in the base 180.

The embodiment of the trigger 110 shown in FIGS. 1A-1F is a lever arm that has a three-to-one (3:1) mechanical advantage. With respect to this embodiment, the greater the mechanical advantage, the less force is required by the burn plug to hold the plug 120 in the closed position (e.g., the position shown in FIGS. 1A and 1B). In the closed position, short end of the lever arm nests into a groove 197 in the plug 120 and holds the plug 120 down in order to prevent haphazard or unintentional triggering until the trigger 110 is actuated. When the trigger 110 is actuated, it causes the plug to move and to permit the transfer of fluid between the first chamber 193 and the second chamber 195. The trigger 110 can be a lever, pin, key, latch, or any device that can that can hold the plug 120 in place, and that can be triggered to release the plug 120. Any material or shape will do as long as it performs these desired actions.

The first chamber 193 may be a pipe, a tank, a conduit, a room or any other space from which fluid may flow. Likewise, the second chamber 195 may be a pipe, a tank, a conduit, a room or any other space from which fluid may flow. The valve 100 may be designed to open if internal pressure in the second chamber 195 exceeds the internal pressure of the first chamber 193 by a given amount. In the embodiment of the valve 100 shown in FIGS. 1A-1F, the greater the mechanical advantage of the trigger 110, the greater the differential pressure that the valve 100 can withstand before opening due to the pressure difference between the first and second chambers 193 and 195.

Plug 120 is attached to the plug opening device 140 and when the valve 100 is in the closed position, the sealing mechanisms 130 provide a fluid-tight seal between the base 180 and the plug 120, thereby preventing fluid transfer between the first and second chambers 193 and 195 through the valve 100. In the present embodiment, plug 120 is an annular ring. Because the annular ring embodiment of plug 120 has a smaller active area than a full disc, the differential pressure has less area to work; therefore, the force on the valve 100 is less. It should be understood that the plug 120 could take on other shapes and forms. It should be noted, that plug 120 can be any solid mass that will prevent leakage of the fluid being held back. Plug 120 could be constructed of essentially any non-porous material that is structurally strong enough to keep the fluid from breaking through.

Plug sealing mechanisms 130 are used to seal the plug 120 to the base 180. Plug sealing mechanisms 130 may be O-rings or gaskets that are often made from rubber. It should be noted, however, that plug sealing mechanisms 130 may be any shape or material suitable for sealing the plug 120 to the base 180, as is known in the art. The plug sealing mechanisms 130 depicted in FIGS. 1A-1F are a set of two O-rings.

A plug opening device 140, such as a spring, provides force to open the valve 100. The spring in this case will have enough force when released to overcome the differential pressure inherent in the design. For example, if the first chamber 193 has a higher pressure than the second chamber 195 a force would result that acts to keep the valve 100 in the closed position. In lieu of a spring, another plug opening device 140 may be used, including another mechanical device that stores energy when held in place, and returns an equivalent amount of energy or force when released. In lieu of a mechanical device, a chemical reaction or compressed gas may be used as the plug opening device 140. For example, the gas may be held under increasing pressure until it expands and causes the plug 120 to open. Base 180 is configured to removeably join or mate to an interface 198 that separates the first chamber 193 from the second chamber 195. For example, the first and second chambers 195 may be pipes and the interface 198 may be an inner surface of one of those pipes.

The electrical connector 150 is attached to a wire 155 which heats when current is applied, causing the burn plug 160 to melt and pull free of the wire 155. The wire 155 may be made of nichrome.

Burn plug 160 may be composed of plastic or metal or other suitable material, and may be chosen for strength and melting point. For example, a plastic e.g., polyoxymethylene or a synthetic polymer may be used. When current is applied to the nichrome wire, it will heat to the melting point and pull away from or separate from the wire 155.

In the embodiment of the valve 100 shown in FIGS. 1A-1F, there are a series of orifices 170, in this case six (6) apertures. The sum of the areas of the six (6) apertures in this embodiment is greater than or equal to the area of an internal bore 181 of the base 180 such that the sum of the final flows through the orifices 170 match or exceed the flow potential of fluid through the internal bore 181.

The plug 120 nests inside the internal bore 181 of the base 180 when the valve 100 is in the closed position. The internal bore 181 may provide the main channel or path leading from the first chamber 193 to the second chamber 195, thus providing a path therebetween along which the fluid may travel. In one embodiment where the first and second chambers 193 and 195 are pipes, the valve 100 may be designed such that the area of the internal bore 181 matches an inner diameter of the pipes. The area of each orifice 170 may be increased by increasing the height h of each orifice 170 such that the base 180 extends further into the second chamber 195.

When the valve 100, as shown in FIGS. 1A-1F, is in the closed position, the plug 120 is compressed into the internal bore 181 of the base 180 with the plug sealing mechanisms 130 acting as seals and is held in position by the lever arm trigger 110, which rests in the groove 197 and is held by the burn plug 160.

To move the valve 100 to the open position, the electrical connector 150 may be attached to a voltage source. As sufficient current passes through the wire 155, the burn plug 160 will melt, which causes the burn plug 160 to pull away from the wire 155 causing the plug opening device 140 to press the plug 120 out of the base 180. The fluid in the first chamber 193 is then allowed to transfer into the second chamber 195 through the series of orifices 170.

The first chamber 193 may be configured to contain a liquid or compressed gas and the second chamber 195 may be configured to be empty or to contain a fluid. In one example operational scenario the valve 100 may be mounted between the first and second chambers 193 and 195 such that when the valve 100 is in the open position gravity causes liquid to drain from the first chamber 193 into the second chamber 195. In other operational scenarios the valve 100 may be used to separate the first and second chambers 193 and 195 that contain gases.

The valve 100 may be used in conjunction with a reaction chamber (for example, a reaction chamber for hydrides), where the first chamber 193 contains water that will drain into the second chamber 195 and allow the water to mix with the hydride when the valve 100 is in the open position. The opening of the valve 100 in this embodiment starts the reaction. The orifice is then big enough to allow reactants to expand into the first chamber 193.

The design of the valve 100 shown in FIGS. 1A-1F allows a differential pressure to exist on either side of the valve 100 and will trigger as intended if the pressure in the second chamber 195 is too high. This allows for the situation of a chemical like a hydride that will begin to react if exposed to water (accidental or intentional). If the valve 100 opens at a set pressure, it acts as a relief valve or "fail safe."

The motion of the valve 100 is in-line with flow allowing for the entire orifice or series of orifices 170 to open without additional space perpendicular to flow. Such a valve is encapsulated by the chamber or pipe and does not need any external appendages. This allows for a large amount of flow given a size restraint, such as when the first chamber 193 is a pipe.

The valve 100 is resistive to highly corrosive environments, such as the reactants and products in hydrogen generation by hydrides. The valve 100 may be made of the same material as the first and second chambers 193 and 195, which can result in avoidance of dissimilar metal corrosion. The material for the valve 100, first chamber 193 and second 195 may be any of the metals available to valves and chambers, or alternatively, plastic. The valve 100 has an open design which will avoid crevice corrosion.

Figure 2:
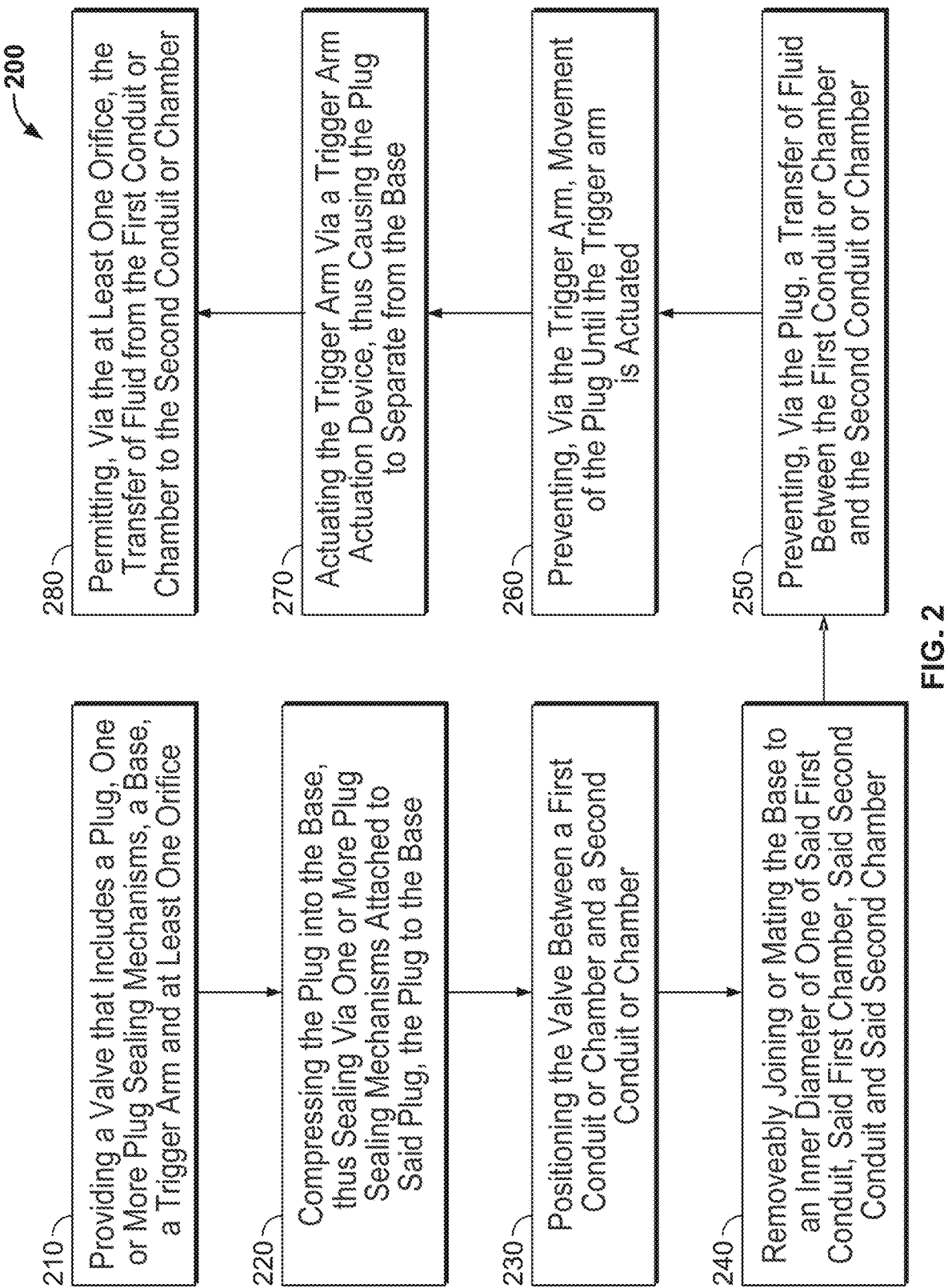
FIG. 2 illustrates a flow chart for using a low-profile, large-aperture, remotely-triggered valve in accordance with aspects of the present disclosure.

FIG. 2 illustrates a flow chart for using a low-profile, large-aperture, remotely-triggered valve in accordance with aspects of the present disclosure. At step 210, the method includes providing a valve that includes a plug, one or more plug sealing mechanisms, a base, a trigger and at least one channel that provides a path along which the fluid may travel from a first chamber to a second chamber.

At step 220, the method includes compressing the plug into the base, thus sealing the plug to the base via one or more plug sealing mechanisms.

At step 230, the method includes positioning the valve between the first chamber and the second chamber. At step 240, the method includes removeably joining or mating the base to an interface between said first chamber and said second chamber. Steps 230 and 240 may be performed by a person in the field who is setting up the valve for use.

At step 250, the method includes preventing, via the plug, a transfer of fluid between the first chamber and the second chamber. The plug is designed to prevent such a fluid transfer as it acts as a blockade between the first chamber and the second chamber. At step 260, the method includes preventing, via the trigger, movement of the plug until the trigger is actuated. The trigger is designed to prevent movement of the plug until the trigger is actuated.

At step 270, the method includes actuating the trigger via a trigger actuation device, thus causing the plug to separate from the base. At step 280, the method includes permitting, via the at least one channel, the transfer of fluid from the first chamber to the second chamber.

The method may further include other steps such as automatically resetting the valve, via a reset actuation device. It should be appreciated that fewer, additional, or alternative steps may also be involved in the process and/or some steps may occur in a different order.

Figure 3A:
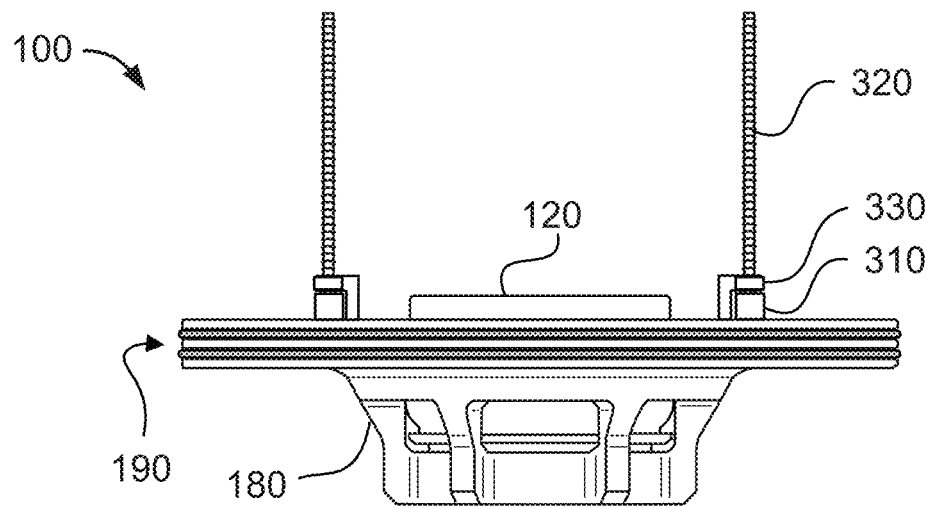
FIGS. 3A-3B are side-view illustrations of an example embodiment of a remotely-triggered valve.
Figure 3B:
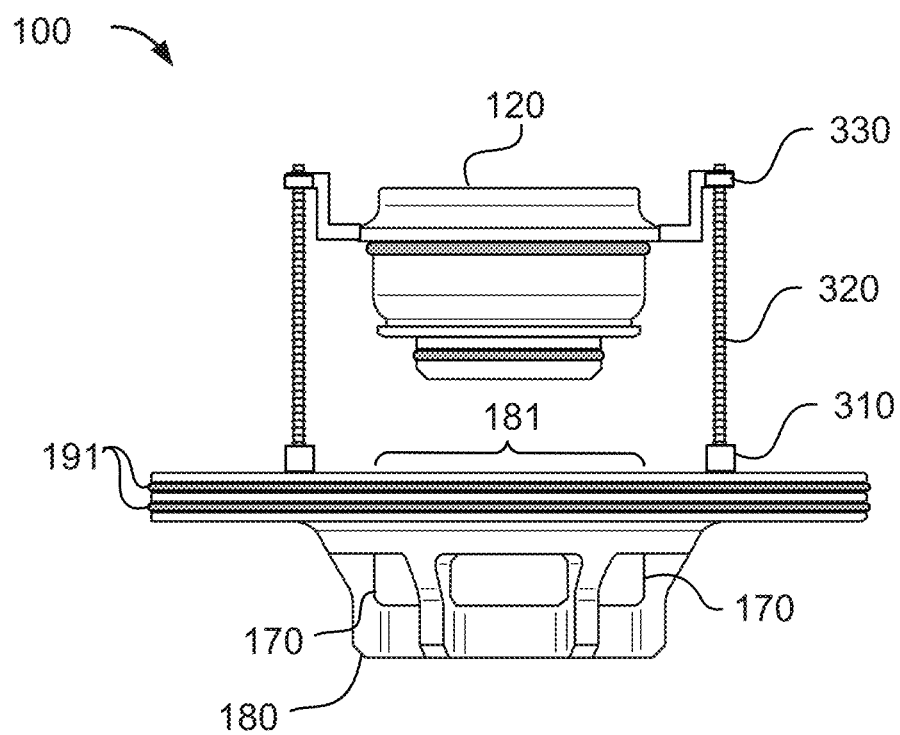

FIGS. 3A and 3B are side-view illustrations of an embodiment of the valve 100 where the trigger 110 comprises motors 310, lead screws 320, and threaded attachment points 330. In this embodiment, the motors 310, lead screws 320, and threaded attachment points 330 function together as the trigger 110 and the plug opening device 140, and can also serve to reset the valve 100 after it has opened. The motors 310 in this embodiment are attached to the base 180 and the threaded attachment points 330 are attached to the plug 120. As the motors 310 turn the lead screws 320 the plug is configured to move linearly in or out of the internal bore 181, depending on the direction of rotation of the lead screws 320. Thus, the motors 310 may be used to move the valve 100 between the open and closed positions. The lead screws 320 may be designed to rotate (with the motors 310 "free-spooling") in the presence of sufficient force due to differential pressure between the first and second chambers 193 and 195. To return the valve 100 to the closed position, the motors 310 may simply be powered again to draw the plug 120 back into internal bore 181.

For automatic reset functionality in other embodiments of the valve 100, the plug 120 may have a lead nut (such as the threaded attachment point 330) embedded. Or, the plug 120 itself may be a lead nut such that the lead screw 320 would pass through the lead nut and cause linear motion, of the plug 120 and thereby allow for the action to be reset. In lieu of this method, any other automatic reset method known in the art may be used such as one that would cause the valve 100 to close by actuation.

In some cases, it may be desirable to use a separate plug opening device 140, such as a spring, in conjunction with the embodiment of the trigger 110 shown in FIGS. 3A and 3B. In other embodiments, the trigger 110 may comprise a combination of spring-loaded latches and motorized means for moving triggering the opening of the valve 100.

The motor 310 may be attached to the base 180 or the tip of the lead screw 320, depending on which chamber (first chamber 193 or second chamber 195) the user desires the motor 310 to be located. Alternatively, the lead screw 320 could be turned via a motor 310, which is mounted outside the first and second chambers and connected to the lead screw 320 by a shaft penetrator into the system.

The conditions that trigger the opening of the valve 100 may be adjusted by adjusting the geometry of the valve 100, orifice size, set relief pressure, pressure differential tolerance, and means of trigger initiation.

Referring back to the embodiment of the valve 100 shown in FIGS. 1A-1F, the orifice size is preferably dictated by the relief function and the strength of the burn plug 160 or wire 155. This could be made stronger with redundant triggers 110 or with a better mechanical advantage such that the internal bore 181 could be larger with preserved differential pressure tolerance. Additionally, the valve 100 may be made as a coupler for two pipes serving as the first and second chambers 193 and 195 such that the area of the internal bore 181 would match or exceed the internal area of the pipes.

To further increase robustness, several trigger arms could be used. The embodiment shown in FIGS. 1A-1F has the capability of housing six (6) trigger arms. This could also increase relief pressure by six times, but with a lower mechanical advantage this is not necessarily the case.

The trigger 110 is not limited to electrical means of a trigger with a burn plug 160. The trigger 110 itself can be made purely mechanical. A signal by means of mechanical motion could be used to trigger the valve 100 and would not then need electrical power. Also, since it acts as a relief valve, pressure in the lower chamber (i.e., the second chamber 195) could trigger the opening. This would outperform a standard relief valve by sacrificing the ability to close again when differential pressure normalized. This would act similarly to a resettable pop off relief valve. The valve 100 could be held closed by a motor with detent at the closed position. This would also accommodate automatic reset as described earlier. Lastly, a magnetic trigger 110 could be employed to cause the valve 100 to open when exposed to external magnetic field.

The foregoing description of various embodiments have been presented for purposes of illustration and description. It is not intended to be exhaustive or to limit the invention to the precise forms disclosed, and many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A valve, comprising:
   a base configured to be mounted between first and second chambers, wherein the base comprises an internal bore and a plurality of orifices in fluid communication with the internal bore;
   a plug shaped so as to provide a fluid-tight seal that prevents a transfer of fluid between the first chamber and the second chamber when the plug is fully inserted into the internal bore;
   a spring operatively coupled to the base and the plug so as to provide force to cause the plug to move out of the internal bore and thus to permit the transfer of fluid between the first chamber and the second chamber;
   a lever arm pivotally mounted to the base, wherein the lever arm comprises a long end and a short end, and wherein the short end is configured to lodge in a groove disposed in the plug when the plug is fully inserted into the internal bore; and
   a trigger releasably mounted between the base and the long end of the lever arm and configured to hold the long end in a fixed position with respect to the base until triggered, at which time the trigger allows the long end to move with respect to the base.

2. The valve of claim 1, wherein the trigger is a burn plug comprising a meltable section and a wire electrically coupled to a voltage source such that when current runs through the wire the meltable section melts and separates from the wire.

3. The valve of claim 2, wherein the wire is a nichrome wire.

4. The valve of claim 2, wherein the meltable section is composed of a plastic.

5. The valve of claim 1, wherein the plug is an annular ring.

6. The valve of claim 5, wherein the plug comprises a set of O-rings disposed around the plug to provide the fluid-tight seal with the internal bore.

7. The valve of claim 1, wherein the first chamber or the second chamber is a pipe.

8. The valve of claim 1, wherein the first chamber or the second chamber is a tank.

9. The valve of claim 1, wherein the internal bore comprises a first end and a second end, wherein the first end is disposed to receive the plug and the plurality of orifices are radially disposed in the body around the second end.

10. The valve of claim 1, wherein the long end of the lever arm is three times the length of the short end.

11. A valve, comprising:
    a plug configured to prevent a transfer of fluid between a first chamber and a second chamber;
    a spring configured to provide force to cause the plug to move in order to permit the transfer of fluid between the first chamber and the second chamber;
    a base, the base being configured to removeably join or mate to an inner surface of one of said first chamber and said second chamber;
    one or more plug sealing mechanisms attached to said plug, the plug sealing mechanisms configured to seal the plug to the base;
    chamber sealing mechanisms configured to seal an inner surface of at least one of said first chamber and said second chamber;
    at least one trigger arm that nests in a groove in the plug, the trigger arm being configured to actuate the spring, thus causing the plug to move and permit the transfer of fluid between the first chamber and the second chamber, wherein the at least one trigger arm is further configured to prevent plug movement until the at least one trigger arm is actuated;
    a trigger arm actuation device configured to actuate the at least one trigger arm, wherein the trigger arm actuation device is a burn plug coupled to an electrical connector, wherein the electrical connector is attached to a wire that heats when current is applied, causing the burn plug to melt and separate from the wire;
    at least one channel disposed between the first chamber and the second chamber, the at least one channel being configured to provide a path for the transfer of fluid between the first chamber and the second chamber, and
    wherein the valve is configured to be positioned between the first chamber and the second chamber.

12. The valve of claim 11, wherein the wire is a nichrome wire.

13. The valve of claim 11, wherein the plug is an annular ring.

14. The valve of claim 11, further comprising: a reset actuation device configured to automatically reset the valve after actuation.

* * * * *